US008675325B2

(12) United States Patent
Beierschmitt et al.

(10) Patent No.: US 8,675,325 B2
(45) **Date of Patent: *Mar. 18, 2014**

(54) ELECTRONIC CIRCUIT BREAKER WITH ALTERNATE MODE OF OPERATION USING AUXILIARY POWER SOURCE

(75) Inventors: Joseph Beierschmitt, Marion, IA (US); Jeremy D. Schroeder, North Liberty, IA (US)

(73) Assignee: Schneider Electric USA, Inc., Palatine, IL (US)

( * ) Notice: Subject to any disclaimer, the term of this patent is extended or adjusted under 35 U.S.C. 154(b) by 656 days.

This patent is subject to a terminal disclaimer.

(21) Appl. No.: 12/908,455

(22) Filed: Oct. 20, 2010

(65) Prior Publication Data

US 2012/0098347 A1 Apr. 26, 2012

(51) Int. Cl.
*H02H 7/00* (2006.01)

(52) U.S. Cl.
USPC .......... 361/78

(58) Field of Classification Search
USPC .......... 361/78
See application file for complete search history.

(56) References Cited

U.S. PATENT DOCUMENTS

| | | | | |
|---|---|---|---|---|
| 4,335,413 | A | 6/1982 | Engel et al. | |
| 4,801,906 | A | 1/1989 | Morris et al. | |
| 4,969,063 | A | 11/1990 | Scott et al. | |
| 5,220,479 | A * | 6/1993 | Fraisse | 361/97 |
| 5,343,192 | A | 8/1994 | Yenisey | |
| 5,452,172 | A * | 9/1995 | Lane et al. | 361/71 |
| 5,546,266 | A | 8/1996 | Mackenzie et al. | |
| 5,847,913 | A | 12/1998 | Turner et al. | |
| 6,717,786 | B2 * | 4/2004 | Holley et al. | 361/93.1 |
| 7,151,656 | B2 | 12/2006 | Dvorak et al. | |
| 7,558,038 | B2 | 7/2009 | Wiese et al. | |
| 2010/0123981 | A1 | 5/2010 | Erger et al. | |

FOREIGN PATENT DOCUMENTS

| | | | |
|---|---|---|---|
| EP | 1589628 | 10/2005 | H02H 1/06 |
| GB | 2290180 | 12/1995 | H02H 1/06 |
| WO | WO/2009/090143 | 7/2009 | H02H 1/06 |

OTHER PUBLICATIONS

International Search Report mailed Feb. 13, 2012 which issued in corresponding International Patent Application No. PCT/US2011/056488 (6 pages).
Written Opinion mailed Feb. 13, 2012 which issued in corresponding International Patent Application No. PCT/US2011/056488 (5 pages).

* cited by examiner

*Primary Examiner* — Stephen W Jackson
(74) *Attorney, Agent, or Firm* — Locke Lord LLP

(57) ABSTRACT

An electronic circuit breaker includes controllable mechanical contacts adapted to connect a primary power source to at least one load; and control circuitry for monitoring the flow of power from the primary power source to the load, detecting fault conditions and automatically opening the contacts in response to the detection of a fault condition. A primary power source supplies power to the control circuitry when the contacts are closed, and an auxiliary power source supplies power to the control circuitry when the contacts are open, whether by a trip or by manual opening.

20 Claims, 2 Drawing Sheets

ELECTRONIC CIRCUIT BREAKER WITH ALTERNATE MODE OF OPERATION USING AUXILIARY POWER SOURCE

FIELD OF THE INVENTION

This invention relates to electronic circuit breakers and particularly to an improved circuit breaker that enters a non-fault-protecting mode of operation, using an auxiliary power source, after a trip signal has been produced.

BACKGROUND

When operating an electronic circuit breaker it is highly desirable that any functions performed to upgrade the software or firmware of the breaker's microcontroller be accomplished without interruption and without sacrificing protection of the load. In a traditional electronic circuit breaker, once tripped, the microcontroller controlling the breaker has no power and is inaccessible. Thus, in past known electronic circuit breakers the microcontroller state is on or off, mirroring the closed or open position, respectively, of the breaker contacts.

To perform a firmware upgrade, the breaker either needs to 1) be removed from the load center, or 2) perform fault protection during the upgrade process, or 3) enter a mode of operation where fault protection is not required. With respect to 1), removing the breaker from the load center is not ideal for firmware upgrades in terms of maintenance time and wear on the breakers and associated equipment, as well as the safety aspects of breaker removal. With respect to 2) there is microprocessor overhead required to provide fault protection during the upgrade process or determining if the breaker can enter a mode of operation where fault protection is not required. One example of updating the firmware while providing protection requires two separate program sections and a separate boot section. To ensure protection is uncompromised, the new program would have to be written into a separate section of memory while the existing program continues to detect for fault protection. Then, once the new program is validated, the processor would have to do a reset, and the boot section of the microcontroller would have to track which firmware program to use in the future in order to always point to the newest program. Additional processor overhead is required to handle the case when a fault is detected, and the new program is being written to the program section to ensure the breaker can't enter a hazardous mode of operation.

Today's residential electronic circuit breakers (AFCI) monitor and protect against many different types of fault conditions. When a circuit breaker trips, it is advantageous to know what type of fault the circuit breaker interrupted in order to accurately and rapidly correct the fault condition. The electronic modules in such circuit breakers are capable of indicating the interrupted fault only when the electronics are powered. Normally this requires re-closing the circuit breaker with its manual handle to power the electronic module. However, re-closing the circuit breaker to indicate the cause of the interrupted fault also means re-energizing the fault if the fault is still present. In order to safely re-close the circuit breaker, an electrician must open the load center and remove the line load and neutral load wires from the circuit breaker. It would be desirable to have a secondary means of powering the electronic module to allow the electronic module to indicate the interrupted fault, without the need to re-energize the fault at levels that would be considered hazardous, thus eliminating the need to remove the load wires from the circuit breaker.

BRIEF SUMMARY

In accordance with one embodiment, an electronic circuit breaker includes controllable mechanical contacts adapted to connect a primary power source to at least one load, and control circuitry for monitoring the flow of power from the primary power source to the load, detecting fault conditions, producing a trip signal in response thereto, and automatically opening the contacts. A primary power source supplies power to the control circuitry when the contacts are closed, and an auxiliary power source supplies power to the control circuitry when the contacts are open.

By supplying the control circuitry with power from an auxiliary power source while the breaker contacts are open, this breaker system avoids any need to close the circuit breaker onto a hazardous fault to determine the reason the circuit breaker tripped. It also avoids any need to remove branch circuit wiring from the circuit breaker, or to remove the circuit breaker from a load center, in order to update firmware, to indicate the cause of a trip, or to perform branch wiring diagnostics.

In one implementation, at least one sensor is coupled to the power flow from the primary power source to the load and produces an output signal representing a characteristic of the power flow, and the control circuitry samples data derived from the output signal and processes that data to detect fault conditions. The control circuitry also detects failures in the data sampling and produces a trip signal in response to a preselected number of detected failures in the data sampling. The control circuitry may detect failures of in the data sampling by detecting the absence of zero crossing in an AC voltage supplied by the primary power source to the load, as will occur upon manually opening the contacts with the breaker handle, thus causing the control circuitry to issue a trip signal.

BRIEF DESCRIPTION OF THE DRAWINGS

The invention may best be understood by reference to the following description taken in conjunction with the accompanying drawings, in which.

DETAILED DESCRIPTION

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
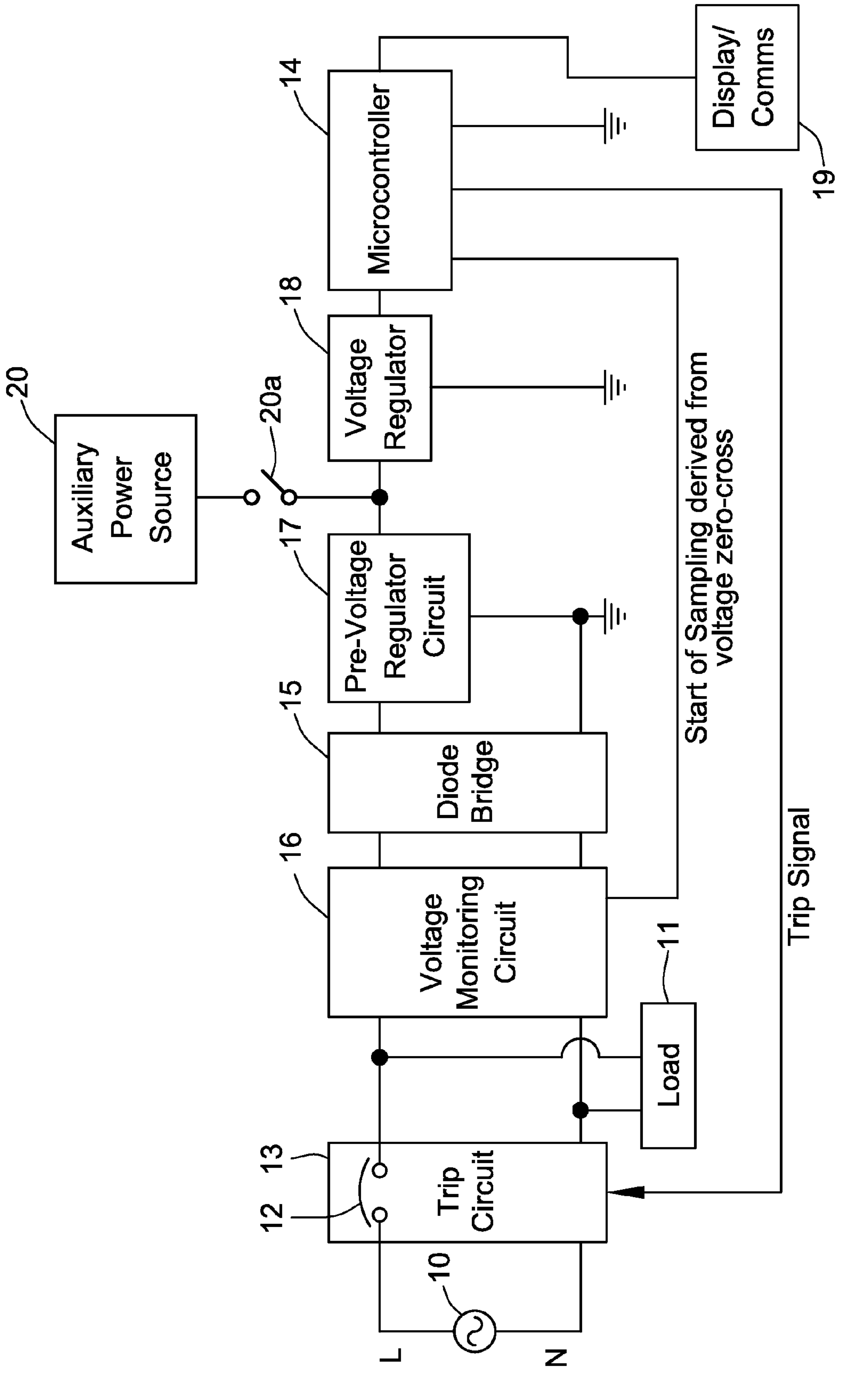
FIG. 1 is a schematic diagram of a portion of the electrical circuitry in an electronic circuit breaker having an auxiliary power source and alternate modes of operation.

FIG. 1 illustrates a portion of the control circuitry for a circuit breaker that monitors the electrical power supplied to one or more loads 11 from a primary power source 10 such as a 120-volt AC power source. During normal operation, i.e., in the absence of a fault, the source 10 supplies AC power to the load 11 through normally closed breaker contacts 12 in a trip circuit 13. In addition, DC power is supplied to the microcontroller 14 in the breaker from a diode bridge 15 that rectifies AC power from the source 10 to produce a DC output supplied to a pre-voltage regulator circuit 17 via a voltage monitoring circuit 16. The pre-voltage regulator circuit 17 in turn supplies power to a voltage regulator 18, which supplies the microcontroller 14 with a regulated DC input voltage.

When a fault is detected by the circuit breaker, the microcontroller 14 generates a trip signal that is supplied to the trip circuit 13 to automatically open the breaker contacts 12 and thus interrupt the flow of electrical current to the load 11. The microcontroller also typically stores information identifying the reason for the trip, such as the detection of a ground fault or an arcing fault.

To enable the microcontroller 14 to be used while the breaker contacts 12 are open, power can be supplied to the microcontroller 14 from an auxiliary power source 20, such as a battery, by closing a switch 20*a*. This connects the auxiliary power source 20 to the voltage regulator 18, which in turn powers the microcontroller 14. It will be appreciated that the battery might be plugged directly into the breaker without the need for a switch.

There are several reasons why it may be desirable to have the capability of operating the microcontroller 14 while the breaker contacts 12 are open. For example, it is desirable to be able to upgrade the firmware of the microcontroller 14 or perform branch wiring diagnostics without the need to remove the breaker from a load center and/or to avoid the need for additional processor overhead within the electronic breaker. As another example, it is desirable to be able to access the microcontroller to determine the type of fault that produced a trip, while the breaker contacts have been opened by a trip signal.

Figure 2:
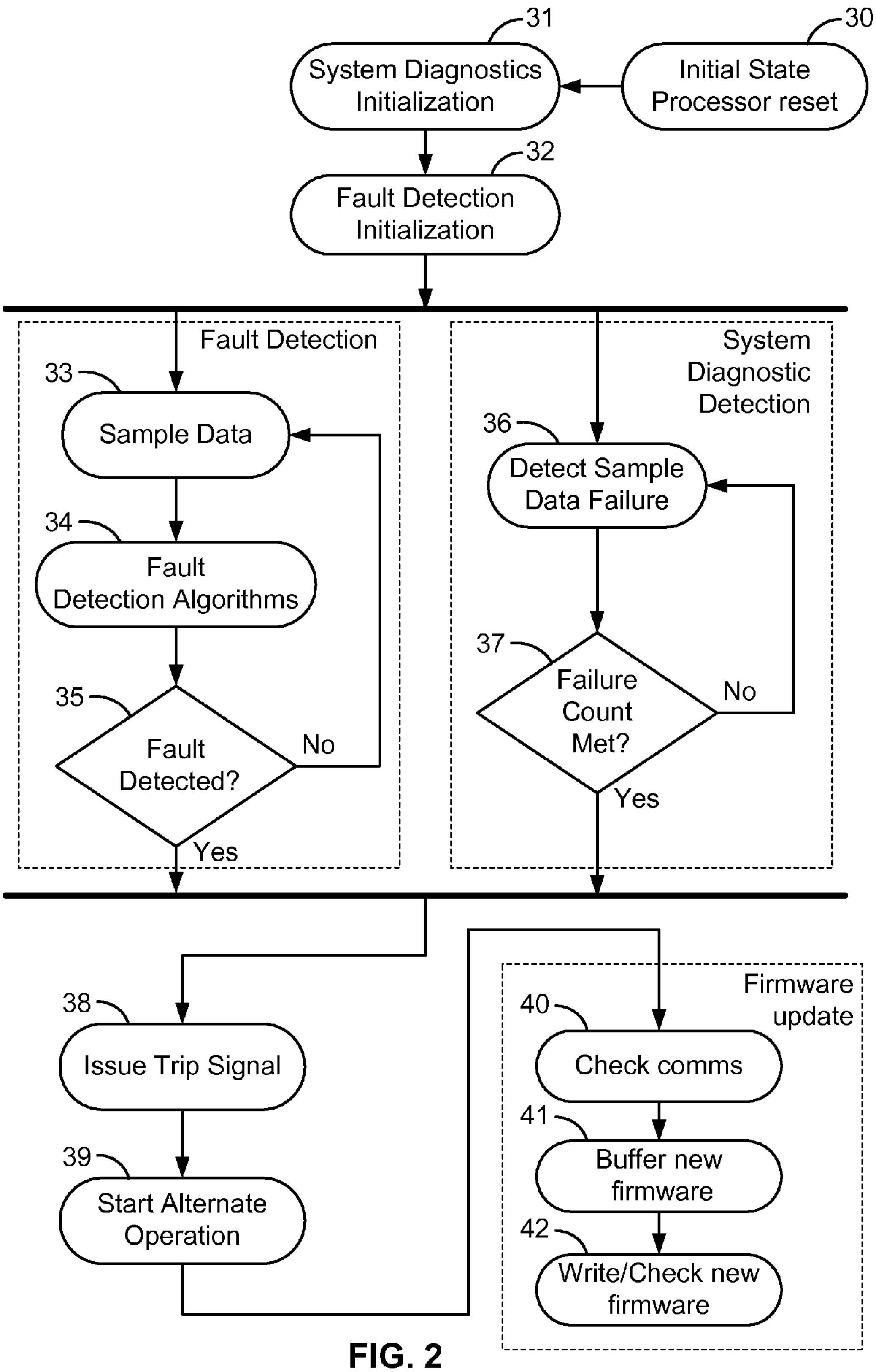
FIG. 2 is a flow diagram of a routine executed by the microcontroller in the circuitry of FIG. 1 for activating the auxiliary power source and controlling the mode of operation of the electronic circuit breaker.

The flow chart in FIG. 2 illustrates how the firmware in the microcontroller 12 permits the electronic circuit breaker to enter either of two mutually exclusive alternative modes of operation that provide either a normal mode of operation (e.g., fault protection) or an alternate mode of operation (e.g., firmware upgrade). Specifically, the two alternate modes of operation permit the microcontroller 14 to be powered by either the primary power supply through the main breaker closed contacts 12, or by the auxiliary power source 20 when the breaker contacts 12 are opened, such as by use of a manual handle included with all circuit breakers for manually controlling and resetting the breaker contacts 12.

Referring to FIG. 2, upon being powered by either source, the firmware enters an initial state in which the initial state of the microcontroller is reset at step 30, diagnostics are initialized at step 31 and fault detection is initialized at step 32. Following the fault-detection initialization, the system advances to a pair of concurrent states represented by steps 33-35 in one path and steps 36-37 in a parallel path.

In the "Fault Detection" path, step 33 samples the data that is used to detect fault conditions (e.g., data derived from the voltage monitoring circuit 16), and then step 34 uses the sampled data in algorithms that are executed to detect when a fault has occurred. As long as no fault is detected, step 35 yields a negative answer, which returns the system to step 33 to continue sampling data from the voltage monitoring circuit 16. This loop continues as long as data continues to be sampled at step 33 and no fault condition is detected by the algorithms executed at step 34.

In the concurrent, parallel "System Diagnostic Detection" path, step 36 detects when there is a failure of the sample data, such as by detecting a start-of-sampling failure (e.g., the non-occurrence of zero crossings of the primary AC voltage). This is a standard fail-safe diagnostic feature in electronic circuit breakers, typically executed by a conventional watchdog timer in the firmware and thus represents no additional processor overhead to the microcontroller 14. Step 37 counts the failures detected at step 36 and determines when the number of consecutive failures reaches a preset "failure count" that indicates a real failure has been detected. As long as step 37 yields a negative answer, the system is returned to step 36 to continue watching for sample data failures. This loop continues as long as the preset "failure count" is not met. If the breaker is manually turned off, i.e. the contacts 12 are opened, the system times out and an affirmative answer is given.

An affirmative answer at either step 35 or step 37 causes a trip signal to be generated at step 38. The trip signal is sent to the trip circuit 13, which opens the main contacts 12 to remove the primary power source 10 from the breaker system. After the trip signal is issued at step 38, an alternate mode of operation is started at step 39.

The alternate mode of operation continues only if the switch 20*a* has been closed to connect the auxiliary power source 20 to the voltage regulator 18 to supply power to the microcontroller 14. If the auxiliary power source 20 is connected, the microcontroller continues to receive power, and thus various operations can be carried out by the microcontroller. When the microcontroller is powered by the auxiliary power source 20, the start-of-sampling event does not occur because the main contacts 12 are open. Thus, several watchdog timeouts occur in succession, which causes an affirmative response at step 37, the generation of a trip signal at step 38, and the start of the alternate mode of operation at step 39. In the alternate mode of operation, the trip signal is always present, so if the main contacts 12 are closed, the trip circuit 13 immediately re-opens those contacts. If the auxiliary power source is removed, e.g., by opening the switch 20*a* or by a battery reaching the end of its life, the alternate mode of operation is terminated. This provides a self-protection feature when the auxiliary power is present.

In the illustrative example of FIG. 2, the system proceeds from step 39 to a "Firmware Update" routine. The first step of this routine is step 40 which checks the communications port of the microcontroller 14, which then receives and buffers new firmware at step 41. Step 42 then writes and checks the new firmware, while the main contacts 12 remain open. As already mentioned, other operations can also be performed in the alternate mode, such as retrieving and displaying the cause of a fault or branch wiring diagnostics. With the main contacts 12 open, no power is supplied to the load 11 during the alternate mode, and thus fault protection is not required. This allows operations such as firmware updating and displaying the cause of fault to be performed in the alternate mode without removing or disconnecting the load wires or the breaker from the load center.

Using the existing diagnostic test for primary AC voltage zero-crossings requires no additional processor overhead to determine when to enter the alternate mode of operation. Processor overhead is defined as using additional clock cycles or more power to execute an operation prior to issuing the trip signal. The watchdog timer is typically part of the standard firmware for an electronic breaker, so there is no additional overhead or additional timing constraints.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A method of operating an electronic circuit breaker that includes controllable mechanical contacts adapted to connect a primary power source to a load, said method comprising:
monitoring a flow of power from said primary power source to said load, detecting fault conditions, producing a trip signal, and automatically opening said mechanical contacts in response to the detection of a fault condition, from control circuitry in said electronic circuit breaker,
supplying power to said control circuitry from said primary power source when said mechanical contacts are closed,
supplying power to said control circuitry from an auxiliary power source when said mechanical contacts are open, and
receiving and storing firmware upgrades while said auxiliary power source is supplying power to said control circuitry and while said mechanical contacts are open.

2. The method of claim 1 which further includes: producing an output signal representing a characteristic of power flow from said primary power source to said load, sampling data derived from said output signal, processing said data to detect fault conditions, detecting failures in said sampled data, and producing a trip signal in response to a preselected number of said detected failures in said sampled data.

3. The method of claim 2 in which said detected failures of said sampled data are detected by detecting the absence of zero crossing in an AC voltage supplied by said primary power source to said load.

4. The method of claim 1 in which said receiving and storing said firmware upgrades includes writing and checking said firmware upgrades while said auxiliary power source is supplying power to said control circuitry and while said mechanical contacts are open.

5. The method of claim 1 which further includes indicating a type of the fault condition that caused the production of the trip signal while said mechanical contacts are open and while said auxiliary power source is supplying power to said control circuitry.

6. The method of claim 1 which further includes automatically switching said control circuitry between a fault-protection mode of operation when said mechanical contacts are closed, and an alternate mode of operation when said mechanical contacts are open.

7. An electronic circuit breaker comprising:
controllable mechanical contacts adapted to connect a primary power source to load,
control circuitry for monitoring a flow of power from said primary power source to said load, detecting fault conditions, and producing a trip signal to automatically open said mechanical contacts in response to the detection of a fault condition,
a voltage regulator for supplying said control circuitry with power from said primary power source when said mechanical contacts are closed,
an auxiliary power source for supplying power to said control circuitry when said mechanical contacts are open, and
at least one sensor coupled to the power flow from said primary power source to said load and producing an output signal representing a characteristic of said power flow, and said control circuitry samples data derived from said output signal and processes said data to detect fault conditions, said control circuitry also detecting failures in said sampled data and producing a trip signal in response to a preselected number of said detected failures in said sampled data.

8. The electronic circuit breaker of claim 7 in which said control circuitry detects failures in said sampled data by detecting the absence of zero crossing in an AC voltage supplied by said primary power source to said load.

9. The electronic circuit breaker of claim 7 in which said control circuitry receives and stores firmware upgrades while said auxiliary power source is supplying power to said control circuitry and while said mechanical contacts are open.

10. The electronic circuit breaker of claim 7 in which said control circuitry indicates a type of the fault condition that caused the production of a trip signal while said mechanical contacts are open and while said auxiliary power source is supplying power to said control circuitry.

11. The electronic circuit breaker of claim 7 in which said auxiliary power source is a battery.

12. The electronic circuit breaker of claim 7 which includes a switch for coupling said auxiliary power source to said control circuitry.

13. The electronic circuit breaker of claim 12 in which said control circuitry includes a microcontroller adapted to receive power via said mechanical contacts when said mechanical contacts are closed or via said auxiliary power source when said mechanical contacts are open, and said microcontroller is programmed to detect fault conditions, to open said mechanical contacts in response to the detection of a fault condition, and to automatically switch between a fault-protection mode of operation when said mechanical contacts are closed, and an alternate mode of operation when said mechanical contacts are open.

14. The electronic circuit breaker of claim 13 in which said microcontroller is programmed to detect the coupling of said primary power source to said microcontroller via said mechanical contacts, and to automatically switch to said alternate mode of operation when said power source is not coupled to said microcontroller via said mechanical contacts.

15. A method of operating an electronic circuit breaker with controllable mechanical contacts adapted to connect a primary power source to a load, the method comprising:
monitoring a flow of power from the primary power source to the load, detecting a fault condition, and producing a trip signal and automatically opening the mechanical contacts in response to the detection of the fault condition, via control circuitry in the electronic circuit breaker,
supplying power to the control circuitry from the primary power source when the mechanical contacts are closed,
supplying power to the control circuitry from an auxiliary power source when the mechanical contacts are open, and
indicating a type of the fault condition that caused the production of the trip signal while the mechanical contacts are open and while the auxiliary power source is supplying power to the control circuitry.

16. The method of claim 15 which further includes: producing an output signal representing a characteristic of power flow from the primary power source to the load, sampling data derived from the output signal, processing the data to detect fault conditions, detecting failures in the sampled data, and producing a trip signal in response to a preselected number of the detected failures in the sampled data.

17. The method of claim 16 in which the detecting failures in the sampled data includes detecting an absence of zero crossing in an AC voltage supplied by the primary power source to the load.

18. The method of claim 15 which further includes receiving and storing firmware upgrades while the auxiliary power source is supplying power to the control circuitry and while the mechanical contacts are open.

19. The method of claim 15 which further includes automatically switching the control circuitry between a fault-protection mode of operation when the mechanical contacts are closed, and an alternate mode of operation when the mechanical contacts are open.

20. A method of operating an electronic circuit breaker with controllable mechanical contacts adapted to connect a primary power source to a load, the method comprising:

monitoring a flow of power from the primary power source to the load, detecting a fault condition, and producing a trip signal and automatically opening the mechanical contacts in response to the detection of the fault condition, via control circuitry in the electronic circuit breaker, supplying power to the control circuitry from the primary power source when the mechanical contacts are closed, supplying power to the control circuitry from an auxiliary power source when the mechanical contacts are open, producing an output signal representing a characteristic of power flow from the primary power source to the load, sampling data derived from the output signal, processing the data to detect fault conditions, detecting failures in the sampled data, and producing a trip signal in response to a preselected number of the detected failures in the sampled data.

* * * * *